rotating the gear sector, which will in turn pull the knife to the left. When the table has risen to its maximum height, as shown in Figure 5, all the parts are in position to return to their original starting positions, as shown in Figure 1.

A distinct advantage of my machine is its safety feature. Since it is natural for an operator to adjust the stack on the table, he will feel the first movement and thus have a warning and sufficient time to remove his hands from under the knife. The slightest upward movement of the table thus warns him of the danger if he has his hands under the knife, or clamp.

Having thus described my invention, what I claim as new and desire to secure by Letters Patent, is:—

1. A cutting machine for sheet materials comprising a table, means for elevating said table vertically, a clamp for said materials independently actuated by the vertical movement of said table, and a cutting knife movable laterally relative to the vertical movement of said table.

2. A cutting machine for sheet materials comprising a frame support, a table movable vertically on said support, means for elevating and lowering said table, a clamp for said materials on said table, said clamp independently actuated by said table, and a cutting knife movable laterally relative to the movement of said table.

3. A machine for cutting stacks of materials comprising an elevating table, clamping means effective against materials on said table actuable independently of the elevating mechanism, and a cutting knife movable laterally relative to the movement of said table to make a shearing cut, said knife movable laterally in synchronism with the elevation of said table.

4. A machine for cutting materials comprising an elevating table, means for elevating said table, clamping means for materials on said table, said clamping means having resilient mounting means and being actuated by said table.

5. A cutting machine for sheet materials comprising a vertically movable table, clamping means for materials on said table, actuable independently of the elevating mechanism, and cutting means movable laterally relative to the vertical movement of said table, said clamping and cutting means movable simultaneously with the movement of said table.

6. In a cutting machine for sheet materials, a vertically movable table, material clamping means actuated only by the movement of material on said table, and cutter means movable laterally relative to the movement of said table actuated by said table.

7. A cutting machine for sheet materials comprising a supporting frame, a vertically movable table mounted on said frame, a material clamp operable by said table and mounted independently of the mechanism for vertically moving the table, cutting means movable laterally relative to the movement of said table, means for laterally moving said cutting means, and auxiliary driving means for said cutting means mounted on said table.

8. A cutting machine for sheet materials comprising a supporting frame, a vertically movable table mounted on said frame, a material clamp operable by said table, and having a yielding compressible mounting, cutting means movable laterally relative to the movement of said table, means for laterally moving said cutting means, and auxiliary driving means for said cutting means mounted on said table, said auxiliary driving means actuated by the movement of said table.

9. A cutting machine for sheet materials comprising a supporting frame, a table mounted for vertical movement on said frame, cutting means movable laterally and operated by said table, clamping means for materials slidably mounted on said frame, and pressure applying means coupled with said clamping means to hold said materials during a cutting operation.

10. A cutting machine for sheet materials comprising a supporting frame, a table mounted for vertical movement on said frame, toggle means for elevating said table, cutting means movable laterally relative to the vertical movement of said table, said means operable by said table, a clamp for materials movable with said table, and spring pressure applying means coupled with said clamp and actuated by the movement of said clamp.

WILLIAM L. VALIQUETTE.

Oct. 16, 1934.　　　E. B. WHITEHEAD　　　1,976,973
CARTON
Filed April 25, 1932
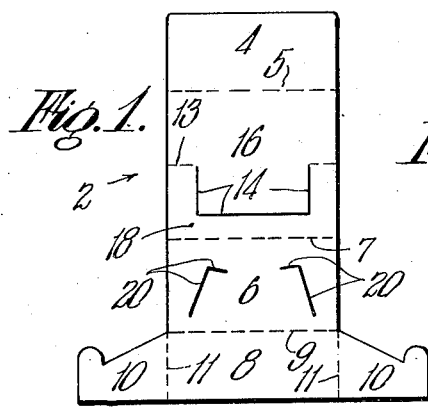
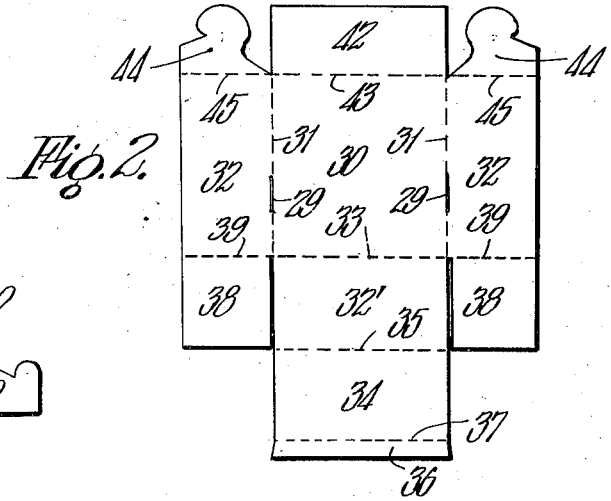
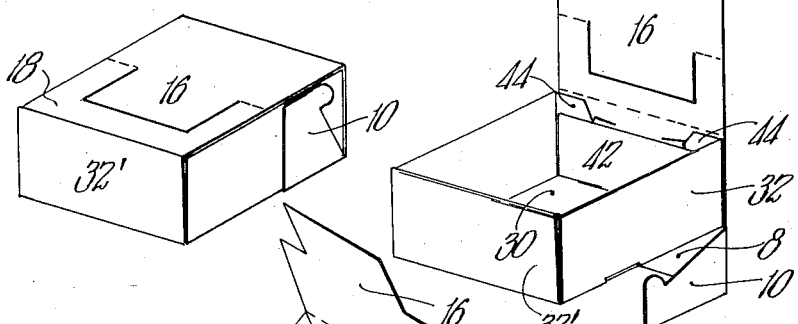
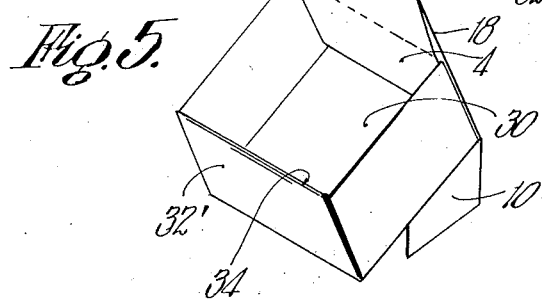
INVENTOR.
Earl B. Whitehead
BY Walter C. Ross
ATTORNEYS.